United States Patent [19]

Sturm et al.

[11] Patent Number: 4,735,980

[45] Date of Patent: Apr. 5, 1988

[54] METHYLENE BIS(ALKYLSULFIDES) AS ANTIOXIDANT SYNERGISTS IN RUBBER

[75] Inventors: Budd H. Sturm, Hartville; Joseph A. Kuczkowski, Munroe Falls; Joel Muse, Kent, all of Ohio

[73] Assignee: The Goodyear Tire & Rubber Company, Akron, Ohio

[21] Appl. No.: 23,592

[22] Filed: Mar. 9, 1987

[51] Int. Cl.$^4$ .............................................. C08K 5/37
[52] U.S. Cl. ................... 524/246; 524/255; 524/257; 524/291; 524/326; 524/350; 524/392
[58] Field of Search ............... 524/257, 291, 303, 304, 524/392, 246, 255, 326, 350

[56] References Cited

U.S. PATENT DOCUMENTS

| | | | |
|---|---|---|---|
| 2,546,941 | 3/1951 | Davey | 524/392 |
| 2,874,192 | 2/1959 | Cottle et al. | 524/392 |
| 3,010,937 | 11/1961 | Roos et al. | 524/392 |
| 3,181,971 | 5/1965 | Rayner | 524/392 |
| 3,258,449 | 6/1966 | Heuck et al. | 524/350 |
| 3,293,209 | 12/1966 | Baldwin et al. | 524/333 |
| 3,478,107 | 11/1969 | Vineyard | 568/57 |
| 3,658,743 | 4/1972 | Bevilacqua | 524/392 |
| 4,595,721 | 6/1986 | Devaux et al. | 524/392 |

Primary Examiner—Veronica P. Hoke
Attorney, Agent, or Firm—D. O. Nickey

[57] ABSTRACT

This invention is concerned with compounds of the structural formula:

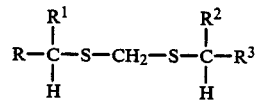

wherein $R^1$ and $R^2$ may be the same or different radical selected from the group consisting of hydrogen and methyl radicals; when $R^1$ is a hydrogen radical, R is an alkyl radical of 5 to 11 carbon atoms; when $R^1$ is a methyl radical, R is a radical of 4 to 10 carbon atoms; when $R^2$ is a hydrogen radical, $R^3$ is an alkyl radical of 5 to 11 carbon atoms; when $R^2$ is a methyl radical, $R^3$ is an alkyl radical of 4 to 10 carbon atoms. These compounds have utility as synergists for phenolic type and amine type antioxidants in the stabilization of natural and synthetic rubbers.

14 Claims, No Drawings

METHYLENE BIS(ALKYLSULFIDES) AS ANTIOXIDANT SYNERGISTS IN RUBBER

TECHNICAL FIELD

This invention relates to an antioxidant synergist for rubbers. More particularly, it relates to rubber compositions stabilized against oxidative degradation, gel formation and Mooney degradation by incorporation of a two component system consisting of a methylene bis(alkylsulfide) and a phenolic and/or amine antioxidant.

BACKGROUND ART

It is well known that organic materials such as plastics, rubbers, lubricating oils, etc. are prone to oxidation and deterioration in the presence of oxygen. Oxidation of organic materials causes the loss of intrinsic properties which are characteristic of the organic material. It is also known that stabilizers useful in, for example poly-α-olefins, are not as effective or sometimes ineffective in the stabilization of diene containing elastomeric polymers. Further, the stabilization of diene containing polymers or rubbers is complicated by the fact that rubbers undergo Mooney viscosity changes and gel formation (among other modes of degradation) during the degradation process. With a view to preventing deterioration of rubbers, a variety of antioxidants have been developed. However, these antioxidants fail to completely prevent the deterioration of the desired physical properties of the rubbers to which they are added. Thus, those skilled in the art are constantly searching for new and more effective antioxidant systems which are useful for the protection of diene containing polymers or rubbers.

Antioxidant synergists have been known in the art for some time. For example, U.S. Pat. No. 3,492,336 discloses tetra-alkyl thioethyl thiodisuccinate compounds for use with phenolic type antioxidants in the stabilization of polyolefins. In addition, U.S. Pat. No. 3,758,549, discloses polyalkanol esters of alkylthio-alkanoic acids as synergists with phenolic antioxidants and U.S. Pat. Nos. 3,666,716 and 3,505,225 disclose derivatives of diphenylamines and the phenylnaphthylamines in combination with dialkyl 3,3'-thiodipropionates.

U.S. Pat. No. 3,010,937 is concerned with the stabilization of polyolefins such as polyethylene, polypropylene and polybutylene. This patent makes the statement that antioxidizing agents conventionally used for natural and synthetic rubbers are sometimes insufficient or are disadvantageous (for example, discoloration of the polymers or the formation of considerable odor) during the preparation of the polyolefins and the processing thereof. More specifically, U.S. Pat No. '937 discloses a process for stabilizing polymers of monoolefins against the influence of oxygen and ozone wherein the improvement comprises using thioacetals as stabilizing agents in an amount from 0.01 to 10% by weight based on the polymer. Specifically, this patent recites the use of formaldehyde-bis-dodecylthioacetals of the formula:

as stabilizers for polymers of mono-olefins, such as polyethylene. This patent does not suggest or disclose the instant invention which is concerned with the discovery that certain methylene bis(alkylsulfides), where the alkyl group can range from 6 to 14 carbon atoms, will dramatically increase the effectiveness of phenolic and amide antidegradants in the stabilization of diene containing polymers. Further, the U.S. Pat. No. '937 does not suggest or disclose a critical ratio between the methylene bis(alkylsulfides) and the antioxidant which would provide excellent antioxidative properties in addition to decreased gel formation and enhanced Mooney viscosity stability.

U.S. Pat. No. 3,258,449 is concerned with the stabilization of polyolefins through the use of 2,6-di-tertiary-butyl-p-cresol and organic sulfides. This patent claims that a compound having the formula:

in which R and R' are hydrocarbon radicals containing 4 to 25 carbon atoms and n is an integer from of 1 to 4 and is useful in the stabilization of olefin polymers such as polypropylene. This patent does not suggest that specific methylene bis(alkylsulfides) when combined with di or tri-substituted phenolic antioxidants or amine antioxidants at specific ratios of antioxidant to methylene bis(alkylsulfides) would provide excellent antioxidative and anti-gelling properties to the elastomeric polymer in which it is incorporated.

U.S. Pat. No. 3,293,209 is concerned with the stabilization of low pressure solid alpha olefin polymers through the use of diethers of dimercaptans. This patent discloses an improved method of stabilizing low pressure solid α-olefin hydrocarbon polymers against process and oxidative degradation. More particularly, it relates to compounds such as diethers of dimercaptans which, in combination with phenolic antioxidants, stabilize the α-olefin polymers against process and oxidative degradation. The diethers of dimercaptans utilized in this patent correspond to the general formula RSR'SR wherein R is an alkyl group containing 12 to 20 carbon atoms and R' is selected from the group consisting of aralkylene, alicyclic, and alkylene alicyclic radicals. It is stated that the compounds described in this patent are themselves stabilizers for polyolefins and are particularly effective with phenolic antioxidants. This patent does not suggest or disclose the criticality of the methylene bis(alkylsulfides) alkyl radicals and the critical relationship of the antioxidant to the methylene bis(alkylsulfide).

U.S. Pat. No. 3,478,107 describes formaldehyde mercaptals and their use as antiwear additives in lubricating oil compositions. The formaldehyde mercaptals of the U.S. Pat. No. '107 are represented by the structure R—S—CH$_2$—S—R$_1$ wherein R and R$_1$ are each independently branched chain alkyl radicals having from 3 to 4 carbon atoms. This patent does not suggest or disclose the discovery of the instant invention wherein specific methylene bis thioethers can be used to synergistically enhance the antidegradative effectiveness of phenolic or amine antioxidants. Further, U.S. Pat. No. '107 does not suggest or disclose the discovery of the instant invention which unexpectedly reduces gel formation and changes in Mooney viscosity of the rubber.

U.S. Pat. No. 4,111,873 is concerned with the thermal stability of halogen containing polymers. Specifically, this patent relates to stabilizing halogen containing polymers, such as polyvinyl chloride, through the use of compounds such as 1,1 bis(octadecylthio)cyclohexane in combination with a divalent metal salt of a carboxylic acid. The U.S. Pat. No. '873 is specifically concerned with stabilizing homopolymers and copolymers of vinyl chloride, vinylidiene chloride or chlorinated polyolefins through the use of a compound such as 1,1-bis[(p-tert-butylphenyl)thio] cyclohexane in combination with a divalent metal salt selected from magnesium, calcium, barium or zinc stearate or mixtures thereof.

The art of combining an antioxidant with a synergist has already been put into practice in industry and such combinations are often highly effective. The inventor herein has prepared a variety of compounds which have been examined with a view towards obtaining more stable rubber compositions. As a result, it has been found that the combined use of certain methylene bis(alkylsulfides) with phenolic or amine antioxidants brings about an unexpectedly powerful antioxidative effect in addition to lessened gel formation and Mooney changes. None of the above cited patents or other literature has suggested the use of specific methylene bis(alkylsulfides) in rubber. Further, the prior art does not suggest the additional benefits that can be obtained when using specific methylene bis(alkylsulfides) with phenolic or amine antidegradants at specific ratios for the stabilization of rubbers.

DISCLOSURE OF THE INVENTION

There is disclosed a process for the preparation of stable rubber compositions, said process comprising: mixing a rubber material with (1) a methylene bis(alkylsulfide) represented by the structural formula:

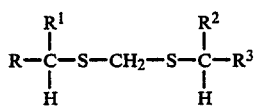

wherein $R^1$ and $R^2$ may be the same or different radical selected from the group consisting of hydrogen and methyl radicals; when $R^1$ is a hydrogen radical, R is an alkyl radical of 5 to 11 carbon atoms; when $R^1$ is a methyl radical, R is a radical of 4 to 10 carbon atoms; when $R^2$ is a hydrogen radical, $R^3$ is an alkyl radical of 5 to 11 carbon atoms; and when $R^2$ is a methyl radical, $R^3$ is an alkyl radical of 4 to 10 carbon atoms; and (2) an antidegradant selected from phenolic antioxidants, and amine antioxidants;

wherein the ratio of antioxidant to methylene bis(alkylsulfide) can range from 4:1 to 1:4 by weight.

In addition, the present invention relates to a stable organic composition which is prepared by mixing an organic material with:

(A) the reaction product of:

(1) a compound of the structural formula: R—SH wherein R may be a primary or secondary alkyl radical of 6 to 14 carbon atoms and;

(2) formaldehyde in the presence of an acid catalyst; and (B) at least one phenolic and/or amine antioxidant.

The compounds of this invention exhibit their novel properties when combined with a variety of stabilizers known as phenolic or amine antidegradants.

DETAILED DESCRIPTION OF THE INVENTION

Methylene bis(alkylsulfides) are not rubber antioxidants in their own right; however, they do regenerate oxidized phenolic and amine antioxidants to their original forms and allow these antidegradants to function time after time as hydrogen donors. It has been determined that the more hindered phenolics are the most effective antioxidants when used in combination with the synergists of this invention. Superior protection of unvulcanized rubber stocks against oxidation, gel formation and Mooney viscosity degradation is experienced when a phenolic or amine type antioxidant is used in combination with the synergists of this invention.

Typical of the phenolic antioxidants that are improved by the addition of compounds of the present invention are phenolic compounds having the general formulae:

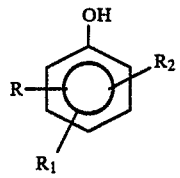

wherein R is hydrogen, an alkyl radical having 4 to 8 carbon atoms, a cycloalkyl radical having 5 to 12 carbon atoms, or an aralkyl radical having 7 to 12 carbon atoms, and wherein $R_1$ and $R_2$ are alkyl radicals having 1 to 12 carbon atoms, cycloalkyl radicals having 5 to 12 carbon atoms, or aralkyl radicals having from 7 to 12 carbon atoms; or a phenolic antioxidant of the formula:

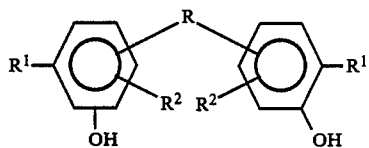

wherein R is an alkylidine radical having 1 to 4 carbon atoms, the group —O—, or the group —S—, and wherein $R^1$ and $R^2$ are alkyl radicals having 1 to 12 carbon atoms, cycloalkyl radicals having 5 to 12 carbon atoms, or aralkyl radicals having 7 to 12 carbon atoms; preferably at least one of $R^1$ and $R^2$ is a tertiary alkyl radical having 4 to 8 carbon atoms and is in a position ortho to the hydroxyl group.

Another phenolic antioxidant useful in this invention is represented by the formula:

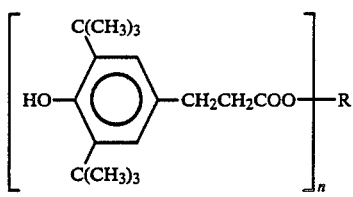

wherein n is an integer from 1 to 4 and R is an alkyl radical having 1 to 20 carbon atoms, an alkylene radical having 2 to 6 carbon atoms, a thiodialkylene radical wherein each alkylene radical has 2 to 6 carbon atoms, a trivalent radical derived from a straight or branched chain hydrocarbon having 3 to 8 carbon atoms, or a tetravalent radical derived from a straight or branched chain hydrocarbon having 1 to 8 carbon atoms.

Typical phenolic antioxidants applicable in the present invention include: 2,6-di-tert-butyl-4-methylphenol, 2,4,6-tri-tert-butylphenol, 2,2'-methylene-bis-(4-methyl-6-tert-butylphenol), 2,2'-thio-bis-(4-methyl-6-tert-butylphenol), 4,4'-thio-bis-(3-methyl-6-tert-butylphenol), 4,4'-butylidene-bis-(6-tert-butyl-3-methylphenol), styrenated phenols, butylated-octylated phenols, butylated α-methylstyrenated phenol, styrenated butylated m,p-cresol, 4,4'-methylenebis(2,6-di-tert-butylphenol), 2,2'-methylenebis[4-methyl-6-(1-methylcyclohexyl)-phenol], butylated reaction product of p-cresol and dicyclopentadiene, tetrakis[methylene 3-(3,5-di-tert-butyl-4-hydroxy-phenyl)propionate] methane, 1,3,5-trimethyl-2,4,6-tris(3,5-di-tert.butyl-4-hydroxy-benzyl)-benzene, thiodiethylenebis [3-(3,5-di-tert-butyl-4-hydroxy-phenyl)propionate], dinonylphenol, butylated di(dimethylbenzyl)phenol, octadecyl3-(3,5-di-tert-butyl-4-hydroxyphenyl) propionate.

The formulae and names represent the major families of presently known phenolic antioxidants. The various R substituents are given to generally describe the substituents that can be placed on the phenolic compounds. The compounds of the present invention have demonstrated synergistic activity with known phenolic and amine antioxidants and the structural formulae are intended to be illustrative and not limiting. The use of di and tri-substituted phenols are preferred since the synergist demonstrates only moderate activity with mono-substituted phenols.

In like fashion the amine antidegradants in general are synergized by the compounds of this invention.

Representative of the amine antidegradants that are useful in this invention include isopropoxydiphenylamine, nonylated diphenylamine, diphenylamine, octylated diphenylamine, phenylnaphthylamine, N,N'-diphenylethylenediamine, N,N'-di-o-tolyethylenediamine, N-phenyl-N'-(1,3-dimethylbutyl)-p-phenylenediamine, N,N'-diphenyl-p-phenylenediamine, phenyl-naphthylamine, aldol-naphthylamine and the like.

The compounds of the present invention will also exhibit synergistic activity with a class of antioxidants known as polymerizable antioxidants. These antioxidants have shown great potential in the stabilization of oxidizable organic materials due to their non-extractability and non-volatility. These antioxidants as monomers are polymerized with one or more comonomers so as to have the antioxidant moiety chemically attached to the polymer structure. These polymerizable phenolic antioxidants are know in the art and are covered by numerous U.S. patents.

The materials that may be protected by the antioxidant system described herein are oxidizable vulcanized and unvulcanized polymers susceptible to oxidative degradation, such as natural rubber, balata, gutta, percha and oxidizable synthetic polymers, including those containing carbon to carbon double bonds, such as rubbery diene polymers, both conjugated and nonconjugated. Representative examples of the synthetic polymers used in the practice of this invention are polychloroprene: homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene and acrylonitrile: butyl rubber, which is a polymerization product of a major proportion of a monoolefin and a minor proportion of a multiolefin such as butadiene or isoprene. Other protectable materials include oils and polyesters.

The methylene bis(alkylsulfides) of the present invention have as one of their characteristic properties the ability to improve the effect of numerous compounds which are used as antidegradants for organic materials. While the compounds of the present invention may not be considered as stabilizers in their own right, their properties are such that they would be more conventionally classified as "synergists", in that, when combined with known stabilizers they exhibit the ability to increase stabilization to a degree far exceeding that which would be expected from the additive properties of the individual components.

The methylene bis(alkylsulfides) may comprise from 20 to 80% of the antioxidant system by weight. However, the maximum effectiveness of the antioxidant system is generally achieved when a compound of the present invention is from 30 to 70% by weight of the antioxidant system. The optimum ratio of a given combination varies depending upon the organic material to be stabilized.

The antioxidant system according to the present invention can be added to said organic materials in various ways. For instance, it can be applied either after dilution with a solvent or directly as is. Addition of the present antioxidant system to the organic material can be performed either by adding a mixture prepared in advance or by adding these ingredients individually. Mixing of the present antioxidant system with substances such as resins and rubbers, which are solid at room temperatures can be readily performed by means of conventional equipment, such as mixers, kneaders and roll mills.

It has been found that addition of the antioxidant system (synergist plus phenolic and/or amine antidegradant) of this invention to organic materials in the range of 0.02 to 10.0 parts per hundred of organic material by weight will effectively protect the organic material from deterioration.

As described above, the antioxidant system according to the present invention comprises the methylene bis(alkylsulfides) claimed herein combined with at least one antioxidant. The antioxidant system of the present invention demonstrates antioxidant activities superior to that of most conventional systems prepared by combining two or more commercial antioxidants.

BEST MODE

The methylene bis(alkylsulfides) may be prepared by combining a mercaptan and formaldehyde and reacting the mixture in the presence of an acid catalyst and an azeotroping solvent such as toluene. The formaldehyde may be added as an aqueous solution thereof such as formalin, a 37% formaldehyde water solution or as paraformaldehyde. Representative of the acid catalysts useful in making the synergists are toluene sulfonic acid, xylene sulfonic acid, methanesulfonic acid, sulfuric acid, glacial acetetic acid, Amberlyst 15 ® and the like.

The azeotroping solvent is used to assist in the removal of the water of reaction. Suitable azeotroping solvents are toluene, xylene or benzene.

Representative of the mercaptans useful in the preparation of the synergist include hexylmercaptan, octylmercaptan, dodecylmercaptan or any primary or secondary mercaptan of 6 to 14 carbon atoms. Tertiary mercaptans are specifically excluded since they do not react to produce a synergist of excellent properties.

The temperatures for producing the synergists of this invention range from room temperature to the boiling point of the reaction mixture. Atmospheric pressure is normally adequate although pressures above or below one atmosphere should not hinder the reaction.

PROCEDURE FOR THE PRODUCTION OF SYNERGIST

To a three necked flask fitted with a thermometer, agitator and water condenser was charged 2 moles of the selected mercaptan, 50 ml of toluene, 100 g of formalin (37% solution of formaldehyde and water) and 10 grams of toluene sulfonic acid. The reaction mixture was heated to 80°–90° C. and agitated 1 to 2 hours and then azeotroped until all the water of solution and water of reaction had azeotroped and condensed overhead. The reaction mixture was cooled, neutralized with aqueous $NaCO_3$, the water layer was removed, the volatiles were stripped off, and the material filtered and utilized as is.

TESTING OF COMPOUNDS

The activity of the compounds of this invention and mixtures of the synergists with commercially available antioxidants was demonstrated by means of the oxygen absorption test. The testing procedure is described in detail in Industrial & Engineering Chemistry, Vol. 43, p. 456, (1951) and Industrial & Engineering Chemistry, Vol. 45, p. 392 (1953).

Synergism is exhibited when a combination of materials is more effective than an equal amount of each component used separately. That is, synergism is evident when a combination of a phenolic or amine antioxidant and a synergist is more active than an equal amount of the phenolic or amine antioxidant or synergist used separately. Synergists within and outside the scope of the present invention were evaluated as synergists with commercially accepted phenolic and amine antioxidants. Wingstay ® C, a product of The Goodyear Tire & Rubber Company, is the reaction product of phenol, α-methylstyrene and isobutylene. Wingstay ® S, a product of The Goodyear Tire & Rubber Company, is a styrenated phenol. Wingstay ® T, a product of The Goodyear Tire & Rubber Company, is an alkylated hindered phenol. Wingstay ® L, a product of The Goodyear Tire & Rubber Company, is the butylated reaction product of para-cresol and dicyclopentadiene. Wingstay ® 29, a product of The Goodyear Tire & Rubber Company, is para-oriented styrenated diphenylamines.

A total of 1 part per 100 of the antioxidant system was added to 100 parts of SBR and aged at 100° C. until 1% $O_2$ was absorbed by weight.

EXAMPLE 1–49

Using the apparatus and procedure described above, numerous synergists were prepared and evaluated alone and in combination with commercially available antidegradants in the oxygen absorption test. Table I sets out the mercaptan used to produce the synergist, the commercial antioxidant if present, and the hours to absorb 1% $O_2$ by weight at 100° C.

INDUSTRIAL APPLICABILITY

From the testing data, it is evident that the methylene bis(alkylsulfides) disclosed herein significantly enhance the stability of the material into which they are incorporated when combined with known antioxidants.

The industrial applications are readily apparent in light of the synergistic activity of these compounds when used in conjunction with known phenolic and amine antioxidants. The use of the compounds of this invention would significantly reduce the amount of costly phenolic or amine antioxidant that is needed to provide the desired stability to the organic material. In addition the use of these novel antioxidant systems would lessen the undesirable effects of color formation, discoloration, gel formation and decrease in Mooney viscosity.

While certain representative embodiments and details have been shown for the purpose of illustrating the invention, it will be apparent to those skilled in this art that various changes and modifications may be made herein without departing from the scope of this invention.

TABLE I

| | | Oxygen Absorption of SBR** | | |
|---|---|---|---|---|
| Ex. No. | Mercaptan R-SH | Antidegradant | Parts PHR Synergist/Antidegradant | Hours to 1% $O_2$ at 100° C. |
| 1+ | n-butyl mercaptan | — | 1.0/0.0 | 3 |
| 2 | n-hexyl mercaptan | — | 1.0/0.0 | 3 |
| 3 | n-octyl mercaptan | — | 1.0/0.0 | 3 |
| 4 | n-dodecyl mercaptan | — | 1.0/0.0 | 2 |
| 5 | n-tetradecyl mercaptan | — | 1.0/0.0 | 2 |
| 6+ | n-hexadecyl mercaptan | — | 1.0/0.0 | 2 |
| 7+ | n-butyl mercaptan | Wingstay ®-S | 0.5/0.5 | 240 |
| 8 | n-hexyl mercaptan | Wingstay ®-S | 0.5/0.5 | 1105 |
| 9 | n-octyl mercaptan | Wingstay ®-S | 0.5/0.5 | 1350 |
| 10 | n-dodecyl mercaptan | Wingstay ®-S | 0.5/0.5 | 890 |
| 11 | n-tetradecyl mercaptan | Wingstay ®-S | 0.5/0.5 | 575 |
| 12+ | n-hexadecyl mercaptan | Wingstay ®-S | 0.5/0.5 | 460 |
| 13+ | — | Wingstay ®-S | 0.0/0.5 | 125 |
| 14+ | — | Wingstay ®-S | 0.0/1.0 | 130 |
| 15+ | n-dodecyl mercaptan | Wingstay ®-S | 0.3/0.7 | 245 |
| 16 | n-dodecyl mercaptan | Wingstay ®-S | 0.5/0.5 | 890 |
| 17 | n-dodecyl mercaptan | Wingstay ®-S | 0.6/0.4 | 760 |
| 18+ | n-dodecyl mercaptan | Wingstay ®-S | 0.9/0.1 | 165 |
| 19+ | — | Wingstay ®-C | 0.0/1.0 | 245 |
| 20+ | n-dodecyl mercaptan | Wingstay ®-C | 0.1/0.9 | 227 |
| 21 | n-dodecyl mercaptan | Wingstay ®-C | 0.2/0.8 | 499 |
| 22 | n-dodecyl mercaptan | Wingstay ®-C | 0.3/0.7 | 636 |
| 23 | n-dodecyl mercaptan | Wingstay ®-C | 0.4/0.6 | 670 |
| 24 | n-dodecyl mercaptan | Wingstay ®-C | 0.5/0.5 | 893 |
| 25 | n-dodecyl mercaptan | Wingstay ®-C | 0.6/0.4 | 840 |
| 26 | n-dodecyl mercaptan | Wingstay ®-C | 0.7/0.3 | 684 |
| 27 | n-dodecyl mercaptan | Wingstay ®-C | 0.8/0.2 | 478 |

TABLE I-continued

| Ex. No. | Mercaptan R-SH | Antidegradant | Parts PHR Synergist/Antidegradant | Hours to 1% O$_2$ at 100° C. |
|---|---|---|---|---|
| 28+ | n-dodecyl mercaptan | Wingstay ®-C | 0.9/0.1 | 114 |
| 29 | sec-dodecyl mercaptan | Wingstay ®-C | 0.5/0.0 | 7 |
| 30 | sec-dodecyl mercaptan | Wingstay ®-S | 0.5/0.5 | 1145 |
| 31 | sec-dodecyl mercaptan | dinonylphenol | 0.5/0.5 | 1150 |
| 32 | n-dodecyl mercaptan | dinonylphenol | 0.5/0.5 | 1130 |
| 33+ | — | dinonylphenol | 0.0/0.5 | 125 |
| 34. | n-dodecyl mercaptan | Wingstay ®-L | 0.5/0.5 | 900 |
| 35 | n-dodecyl mercaptan | Wingstay ®-29 | 0.5/0.5 | 890 |
| 36 | n-dodecyl mercaptan | Wingstay ®-T | 0.5/0.5 | 895 |
| 37+ | n-dodecyl mercaptan | p-mononylphenol | 0.5/0.5 | 360 |
| 38+ | — | DLTDP* | 0.0/0.5 | 85 |
| 39+ | — | Wingstay ®-S/DLTDP | 0.5/0.5 | 775 |
| 40+ | — | Wingstay ®-C/DLTDP | 0.5/0.5 | 675 |
| 41+ | — | Wingstay ®-L | 0.0/1.0 | 355 |
| 42+ | — | Wingstay ®-L | 0.0/0.5 | 365 |
| 43+ | — | Wingstay ®-29 | 0.0/1.0 | 495 |
| 44+ | — | Wingstay ®-29 | 0.0/0.5 | 505 |
| 45+ | — | Wingstay ®-T | 0.0/1.0 | 350 |
| 46+ | — | Wingstay ®-T | 0.0/0.5 | 340 |
| 47+ | — | p-mononylphenol | 0.0/1.0 | 67 |
| 48+ | — | p-mononylphenol | 0.0/0.5 | 50 |
| 49+ | — | dinonylphenol | 0.0/1.0 | 125 |

+Outside the scope of this invention.
*Dilaurylthiodipropionate - commercially available synergist widely used in the rubber industry.
**SBR - styrene butadiene rubber containing 23½% bound styrene.

What is claimed is:

1. A process for the preparation of a stable rubbery diene polymeric compositions, said process comprising:
   mixing a rubbery diene polymer with an antioxidant sufficient amount of
   (1) a methylene bis(alkylsulfide) represented by the structural formula:

$$R-\underset{\underset{H}{|}}{\overset{\overset{R^1}{|}}{C}}-S-CH_2-S-\underset{\underset{H}{|}}{\overset{\overset{R^2}{|}}{C}}-R^3$$

wherein $R^1$ and $R^2$ are the same or different radical selected from the group consisting of hydrogen and methyl radicals: when $R^1$ is a hydrogen radical, R is an alkyl radical of 5 to 11 carbon atoms; when $R^1$ is a methyl radical, R is a radical of 4 to 10 carbon atoms; when $R^2$ is a hydrogen radical, $R^3$ is an alkyl radical of 5 to 11 carbon atoms; and when $R^2$ is a methyl radical, $R^3$ is an alkyl radical of 4 to 10 carbon atoms; and
   (2) an antidegradant selected from phenolic antioxidants and amine antioxidants;
   wherein the ratio of antioxidant to methylene bis(alkylsulfide) can range from 4:1 to 1:4 by weight.

2. A process according to claim 1 wherein the rubber material is selected from natural rubber polyisoprene, polybutadiene, styrene-butadiene copolymer and butyl rubber.

3. A process according to claim 1 wherein R and $R^3$ are n-alkyl radicals of 5, 7, 9, or 11 carbon atoms and $R^1$ and $R^2$ are hydrogen radicals.

4. A process according to claim 1 wherein the antioxidant is at least one selected from the group consisting of 2,6-di-tert-butyl-4-methylphenol; 2,2'-methylene-bis-(4-methyl-6-tert-butylphenol); styrenated phenols; butylated-octylated phenols; butylated β-methylstyrenated phenol; butylated reaction product of p-cresol and dicyclopentadiene; isopropoxydiphenylamine; diphenylamine; nonylated diphenylamine; octylated diphenylamine; N,N'-diphenyl-ethylenediamine; N-phenyl-N'-(1,3-dimethylbutyl)-p-phenylenediamine and phenyl-naphthylamine.

5. A process according to claim 1 wherein the ratio of antioxidant to methylene bis(alkylsulfide) can range from 3:1 to 1:3.

6. A process according to claim 1 wherein the ratio of antioxidant to methylene bis(alkylsulfide) can range from 2:1 to 1:2.

7. A process according to claim 1 wherein the ratio of antioxidant to methylene bis(alkylsulfide) can range from 1:1.

8. A stable rubbery diene polymer which is prepared by mixing a rubbery diene polymer with an antioxidant sufficient amount of:
   (A) the reaction product of:
      (1) a mercaptan of the structural formula: R—SH wherein R may be a primary or secondary alkyl radical of 6 to 12 carbon atoms and;
      (2) formaldehyde in the presence of an acid catalyst wherein the mol ratio of mercaptan to formaldehyde is about 2:1; and
   (B) at least one phenolic and/or amine antioxidant.

9. A stable rubbery diene polymer according to claim 8 wherein the organic material is selected from the group consisting of natural rubber polyisoprene, polybutadiene, SBR and butyl rubber.

10. A stable rubbery diene polymer according to claim 8 wherein R and $R^3$ are n-alkyl radicals of 5, 7, 9, or 11 carbon atoms and $R^1$ and $R^2$ are hydrogen radicals.

11. A stable rubbery diene polymer according to claim 8 wherein the antioxidant is at least one selected from the group consisting of 2,6-di-tert-butyl-4-methylphenol; 2,2'-methylene-bis-(4-methyl-6-tert-butylphenol); styrenated phenols; butylated-octylated phenols; butylated β-methylstyrenated phenol; butylated reaction product of p-cresol and dicyclopentadiene; isopropoxydiphenylamine; diphenylamine, nonylated diphenylamine; octylated diphenylamine; N,N'-diphenyl-ethylenediamine; N-phenyl-N'-(1,3-dimethylbutyl)-p-phenylenediamine and phenyl-naphthylamine.

12. A stable organic composition according to claim 8 wherein the ratio of antioxidant to methylene bis(alkylsulfide) can range from 3:1 to 1:3.

13. A stable organic composition according to claim 8 wherein the ratio of antioxidant to methylene bis(alkylsulfide) can range from 2:1 to 1:2.

14. A stable organic composition according to claim 8 wherein the ratio of antioxidant to methylene bis(alkylsulfide) can range from 1:1.

* * * * *